(12) United States Patent
Sander et al.

(10) Patent No.: US 8,989,028 B2
(45) Date of Patent: Mar. 24, 2015

(54) ROAMING CONTROL FOR IMS APN

(75) Inventors: Ann-Christine Sander, Vastra Frölunda (SE); Ralf Keller, Würselen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/264,293

(22) PCT Filed: Oct. 7, 2011

(86) PCT No.: PCT/EP2011/067596
§ 371 (c)(1),
(2), (4) Date: Oct. 13, 2011

(87) PCT Pub. No.: WO2012/095197
PCT Pub. Date: Jul. 19, 2012

(65) Prior Publication Data
US 2013/0279401 A1    Oct. 24, 2013

Related U.S. Application Data

(60) Provisional application No. 61/432,215, filed on Jan. 13, 2011.

(51) Int. Cl.
*H04W 8/04* (2009.01)
*H04W 8/06* (2009.01)
*H04W 8/08* (2009.01)
(Continued)

(52) U.S. Cl.
CPC ............... *H04W 8/06* (2013.01); *H04W 48/18* (2013.01); *H04W 76/00* (2013.01)
USPC .... 370/252; 370/328; 370/395.52; 455/456.6

(58) Field of Classification Search
CPC ........ H04W 48/18; H04W 76/00; H04W 8/06
USPC ................... 370/328; 455/433, 466
See application file for complete search history.

(56) References Cited

U.S. PATENT DOCUMENTS

| | | | |
|---|---|---|---|
| 6,611,516 B1 * | 8/2003 | Pirkola et al. ................. 370/352 |
| 8,351,964 B2 * | 1/2013 | Cai et al. ....................... 455/466 |
| 8,891,443 B2 * | 11/2014 | Hu ................. 370/328 |
| 2007/0165630 A1 * | 7/2007 | Rasanen et al. .............. 370/389 |
| 2008/0037515 A1 * | 2/2008 | Sander .......................... 370/352 |

(Continued)

OTHER PUBLICATIONS

Superseded PacketCable 2.0 IMS Delta PKT-SP-23.008-I02-070925.*

(Continued)

*Primary Examiner* — Edan Orgad
*Assistant Examiner* — Emmanuel Maglo
(74) *Attorney, Agent, or Firm* — Withrow & Terranova, PLLC (57) ABSTRACT

The embodiments herein relate to a method in a second node (310) in a visited network (300v). The visited network (300v) is visited by a UE (301). The second node (310) receives a message comprising subscription information. The subscription information comprises a parameter indicating that the UE (301) is allowed to use a multimedia service in the home (300h) or the visited network (300v). The second node (310) selects a serving gateway (308) in the visited network (300v). Based on the parameter, the second node (310) selects a visited PDN gateway (305v), in the visited network (300v) when the UE (301) is allowed to use the multimedia service in the visited network (300v). Based on the parameter, the second node (310) selects a home PDN gateway (305h) in the home network (300h) when the UE (301) is allowed to use the multimedia service in the home network (300h).

35 Claims, 8 Drawing Sheets

(51) Int. Cl.
*H04W 48/18* (2009.01)
*H04W 76/00* (2009.01)

(56) References Cited

U.S. PATENT DOCUMENTS

| | | | |
|---|---|---|---|
| 2009/0047947 A1 | 2/2009 | Giaretta et al. | |
| 2009/0207757 A1* | 8/2009 | Andreasen et al. | 370/254 |
| 2009/0232019 A1* | 9/2009 | Gupta et al. | 370/252 |
| 2010/0144344 A1* | 6/2010 | Jiang | 455/433 |
| 2010/0232353 A1* | 9/2010 | Hu et al. | 370/328 |
| 2010/0250753 A1* | 9/2010 | Song et al. | 709/227 |
| 2010/0331023 A1* | 12/2010 | Cai et al. | 455/466 |
| 2011/0098063 A1* | 4/2011 | Richardson | 455/466 |

OTHER PUBLICATIONS

3rd Generation Partnership Project; Technical Specification Group Services and Systems Aspects; General Packet Radio Service (GPRS) enhancements for Evolved Universal Terrestrial Radio Access Network (E-UTRAN) access (Release 10): 3GPP TS 23.401, Jan. 2011, 276 pages.

International Search Report and Written Opinion for PCT/EP2011/067596 mailed Feb. 28, 2012, 10 pages.

"APN resolution in the VPLMN if using LBO," Change Request Form Version 10.4.0, S2-113029, Jun. 14, 2011, 7 pages.

"APN resolution in the VPLMN if using LBO," Change Request Form Version 10.4.0, S2-113028, Jun. 14, 2011, 6 pages.

\* cited by examiner

ROAMING CONTROL FOR IMS APN

This application is a 35 USC 371 national phase filing of PCT/EP2011/067596, filed Oct. 7, 2011, which claims priority to U.S. provisional application No. 61/432,215, filed Jan. 13, 2011, the disclosures of which are incorporated herein by reference in their entireties.

TECHNICAL FIELD

Embodiments herein relate generally to a first network node, a method in the first network, a second network node and a method in the second network node. More particularly the embodiments herein relate to allowing a user equipment to use multimedia services in a visited communication network.

BACKGROUND

In a typical cellular system, also referred to as a wireless communications network, communication network or network, wireless terminals, also known as mobile stations and/or User Equipment units (UEs) communicate with a radio network node in a Radio Access Networks (RAN). The UE is a mobile terminal by which a subscriber may access services offered by an operator's Core Network (CN) and services outside operator's network to which the operator's RAN and CN provide access The radio access network covers a geographical area which is divided into cell areas, with each cell area being served by a base station, e.g. a Radio Base Station (RBS), which in some radio access networks is also called an evolved NodeB (eNB), eNodeB, B node or base station. The base station communicates over the air interface operating on radio frequencies with the user equipment(s) within range of the base station. The RAN may implement different Radio Access Technologies (RAT), such as Long Term Evolution (LTE), Global System for Mobile Communications (GSM), Universal Mobile Telecommunications System (UMTS), (Worldwide Interoperability for Microwave Access (WiMAX) etc.

Figure 1:
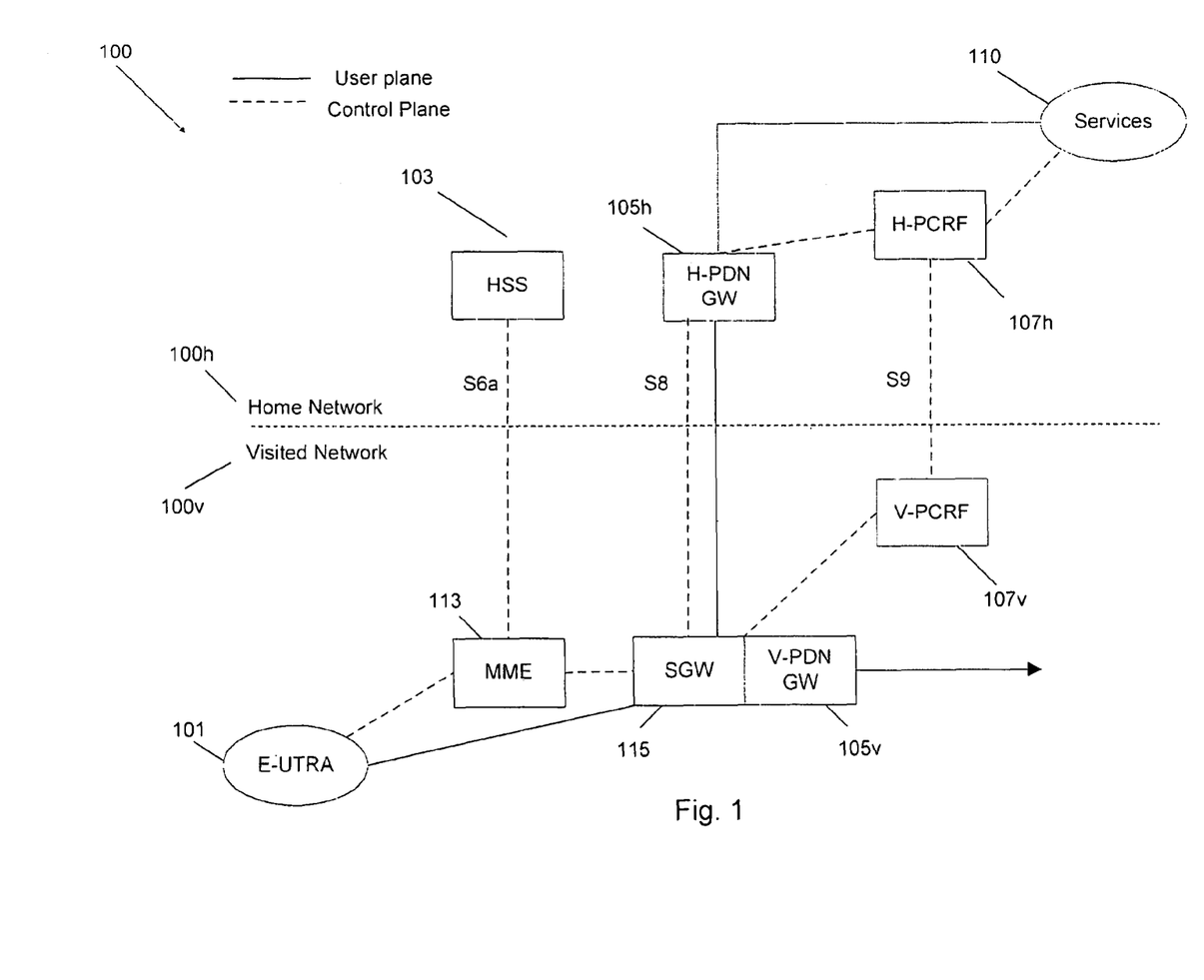
FIG. 1 is a block diagram illustrating embodiments of roaming architecture for LTE/EPC.

FIG. 1 is a block diagram illustrating embodiments of the architecture of a communication network 100 comprising a home network 100*h* and a visited network 100*v*. The home network 100*h* refers to the network being registered as the home of a user equipment (not shown). A user equipment may roam between for example the home network 100*h* and the visited network 100*v*. The network 100 comprises Evolved-UMTS Terrestrial Radio Access Network (E-UTRAN) 101 on the access side and Evolved Packet Core (EPC) on the core side. E-UTRAN 101 is the air interface of LTE. The E-UTRAN 101 comprises base stations, such as e.g. eNodeBs (not shown), which interfaces with user equipment(s) (not shown). The continuous line represents user plane and the dotted line represents the control plane. For illustration purposes only, the home network 100*h* and the visited network 100*v* are separated by a dotted line, which is different from the dotted line representing the control plane.

The home network 100*h* comprises a Home Subscriber Server (HSS) 103, a home PDN GW (H-PDN GW) 105*h* and a home Policy charging and rules function (H-PCRF) 107*h*. The H-PDN GW 105*h* is connected to a packet data network providing operator Internet Protocol (IP) Services 110 such as IP Multimedia Subsystem (IMS), PSS etc. IMS is an architectural framework for delivering Internet Protocol (IP) multimedia services. The HSS 103 is a database comprising subscription data and authentication data. The HSS 103 is connected to a mobile management entity (MME) 113 in the visited network 100*v* via an S6a interface. The MME 113 is for example responsible for choosing the appropriate PDN GW 105 for a user equipment data session. The H-PDN GW 105*h* is the node in the network 100 that allocates and reserves IP addresses to user equipments currently registered to the network 100. The H-PDN GW 105*h* also takes care of policy and charging enforcement, and receives the policies from the H-PCRF 107*h*. The visited network 100*v* comprises a Serving GateWay (SGW) 115 which routes and forwards user data packets, while also acting as the mobility anchor for the user plane during inter-eNB handovers and as the anchor for mobility between LTE and other 3GPP technologies. The SGW 115 in the visited network 100*v* is connected to the H-PDN GW 105*h* via an S8 interface. The S8 interface is an inter-public land mobile network (PLMN) reference point providing user and control plane between the SGW 115 in the visited network 100*v* and the H-PDN GW 105*h* in the home network 100*h*.

The visited network 100*v* further comprises a visited PDN GW (V-PDN GW) 105*v*. The V-PDN GW 105*v* also takes care of policy and charging enforcement, and receives the policies from a visited PCRF (V-PCRF) 107*v*. The interface between the H-PCRF 107*h* and the V-PCRF 107*v* is called S9. The S9 interface provides transfer of policy and charging control information between the H-PCRF 107*h* and the V-PCRF 107*v* in order to support local breakout function.

The Long Term Evolution (LTE)/Evolved Packet Core (EPC) architecture supports Packet Switched (PS) roaming, as illustrated in FIG. 1, and is similar to the one deployed for Global System for Mobile communications (GSM) and Wideband Code Division Multiple Access, (WCDMA).

For LTE/EPC a Packet Data Network Gateway in the home network 100*h*, i.e. a H-PDN GW 105*h*, is usually selected, although the third Generation Partnership Project (3GPP) specifications also allow a PDN GW in the visited network 100*v*, i.e. V-PDN GW 105*v* to be selected.

When an operator decides to add support for IMS services such as e.g. voice services, additional network elements/nodes are required compared to what is illustrated in FIG. 1. The additional network elements are illustrated in the high-level IMS Voice Roaming Architecture of an embodiment of a communication network 200 shown in FIG. 2. The continuos line depicts the media plane, and the dotted line depicts the control plane.

Figure 2:
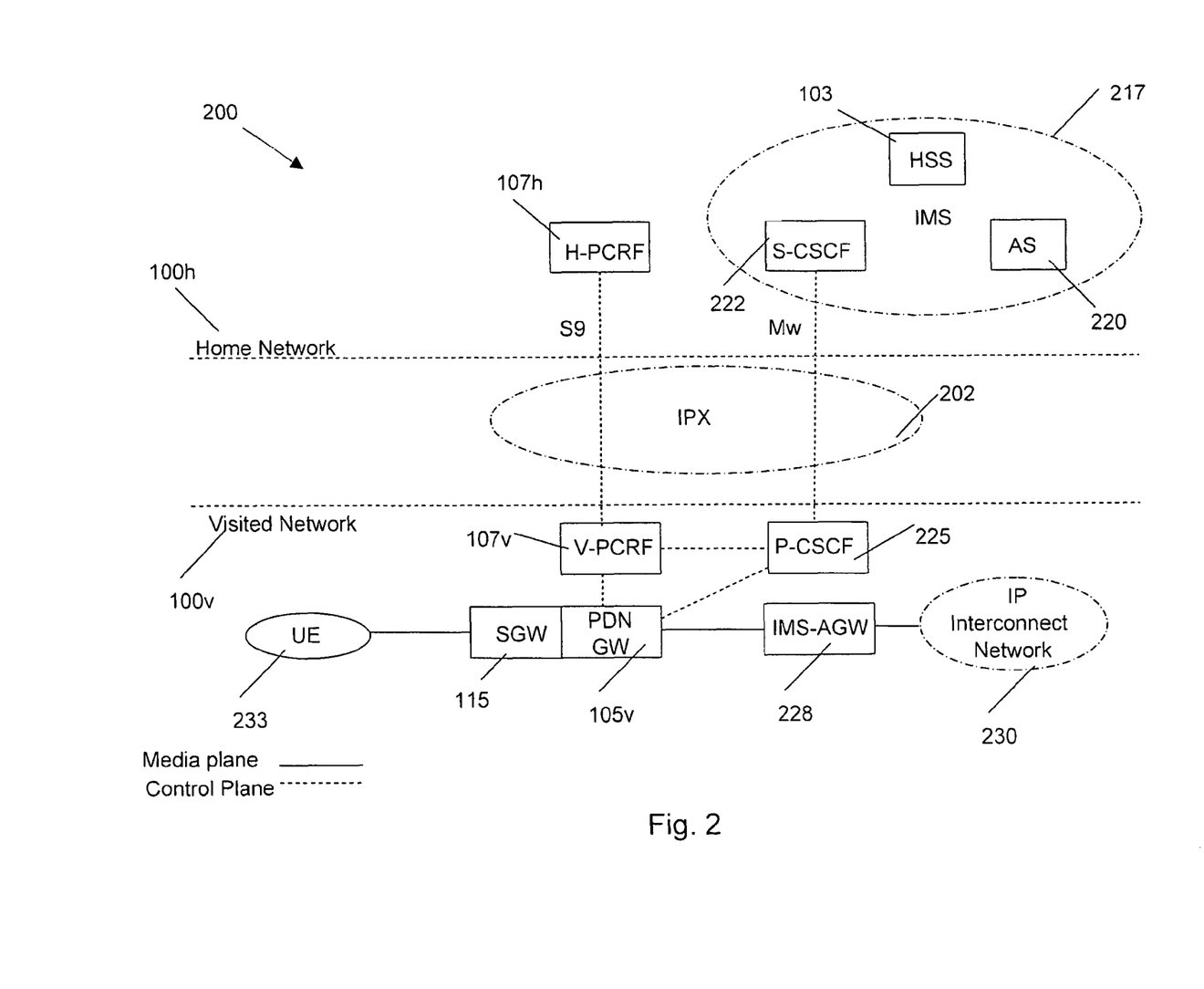
FIG. 2 is a block diagram illustrating embodiments of an IMS Voice Roaming Architecture.

Some of the elements in the network 200 shown in FIG. 2 are the same as the elements shown in the network 100 in FIG. 1. For the sake of simplicity, a description of these elements are not repeated here with reference to FIG. 2. Only the additional elements needed for the IMS services are described in detail with reference to FIG. 2.

Internetwork Packet Exchange (IPX) 202 is the Open Systems interconnection (OSI)-model Network layer protocol located between the home network 100*h* and the visited network 100*v*.

The IMS 217 defines a generic architecture for offering Voice over IP (VoIP) and multimedia services. It is an architectural framework for interoperability and roaming, and it provides bearer control, charging and security. IMS 217 comprises an Application Server (AS) 220 and a Serving-Call Session Control Function (S-CSCF) 222. The AS 220 host and execute services, and interface with the S-CSCF 222 using Session Initiation Protocol (SIP). The S-CSCF 222 is the central node of the signaling plane, and is always located in the home network 100*h*.

The visited network 100*v* comprises a Proxy-CSCF (P-CSCF) 225. In some embodiments, the P-CSCF 225 may be in the home network 100*h* instead of in the visited network 100v, i.e. when the visited network is not IMS compliant yet. The interface between the S-CSCF 222 and the P-CSCF 225 is called Mw, and it is used to exchange messages between CSCFs.

The visited network 100v further comprises an IMS-Access GateWay (IMS-AGW) 228.

This network element provides an interface between the radio network, i.e. access network, and the IP Interconnect Network 230.

Note that a V-PDN GW 105v in the visited network 100v is assumed. The advantage compared to a H-PDN GW 105h in the home network 100h is for example to keep the latency low in different roaming scenarios and that the visited network 100v may be service aware.

However, there are other IMS services than voice, and such service may use a home routed Access Point Name (APN), in case the visited network 100v doesn't support the IMS APN.

To enable the usage of a V-PDN GW 105v in the visited network 100v, an APN that points to a visited network V-PDN GW 105v is required.

If a user equipment 233, that uses the IMS APN for voice services in its home network 100h, visits a network that doesn't support IMS voice, the user equipment 233 shall still use the IMS APN to negotiate any supplementary service for IMS voice service settings.

However, there are mechanisms defined to tell the user equipment 233 if IMS voice is supported in the visited network 100v.

The serving network, i.e. serving public land mobile network (PLMN), shall send an indication toward the user equipment 233 during the Attach procedure and Tracking Area Update procedures if an IMS voice over Packet Switched (PS) session is supported. The serving network uses this indicator to indicate to the user equipment 233 whether it may expect a successful IMS voice over PS session. A user equipment 233 with "IMS voice over PS" voice capability should take this indication into account when establishing voice over PS sessions as well as when determining whether to deactivate the special handling of Idle mode Signaling Reduction (ISR) locally.

The serving network provides this indication based e.g. on local policy, home network 100h, the Single Radio Voice Call Continuity (SRVCC) capability of the network 200 and user equipment 233 and/or extends of E-UTRAN/UTRAN coverage. The serving network indicates to the user equipment 233 that the user equipment 233 may expect a successful IMS voice over PS session only if the MME 113 is configured to know that the serving network has a roaming agreement for IMS voice with the home network 100h of the user equipment 233. This indication is per Tracking Area Identity (TAI) list.

For Voice over LTE roaming to work, a "well-known" Access Point Name (APN) used for IMS services has been defined. The APN name must be "IMS", which is also the APN Network Identifier part of the full APN. The APN Operator Identifier part of the full APN depends on the PLMN who's PDN GW 105 the user equipment 233 is anchored to.

The IMS APN should be provisioned as the Default APN for the IMS subscriber. When provisioning the IMS APN, the following subscription details have to be taken into account:
All Packet Oriented Services must not be barred
Packet Oriented Services from access points that are within the roamed to visited network 100v must not be barred
Visited network 100v Address must be allowed for the IMS APN
EPS subscribed Quality of Service (QoS) profile QoS Class Identifier (QCI) must be set to five for the APN
The APN must be named "IMS"

If the user equipment 233 provides the IMS APN to the network, then the gateway selection logic follows the "An APN was sent by the MS" procedures. The UE should not provide the APN Operator Identifier so that the expected gateway selection logic would be the same as in the case where the network provided the Default APN.

If some operators are using the IMS APN without having IMS roaming agreement in place with all other operators, roaming users may get the IMS APN resolved to a PDN GW 105 in a visited network 100v without IMS roaming agreement. The "IMS voice over PS Session Supported Indication" will help the user equipment 233 to decide if IMS voice may be used or not, but it doesn't state if the IMS APN may be used for supplementary services interrogation or for example for Rich Communication Suite (RCS). The result will be that the user equipment 233 gets the IMS APN resolved to the local PDN GW 105, and the local P-CSCF 107. But, since there is no IMS roaming agreement, only an LTE roaming agreement, any IMS traffic will not be forwarded to the home IMS network 100h, and the roaming end user may not get any IMS services.

A home operator may avoid roaming users to get a local PDN GW 105 by setting the "VPLMN Address Allowed" flag in HSS 103 to stop visited services, but this will stop all roaming for the user on this APN. In a scenario where some operators have IMS roaming agreements and some haven't, this flag may not be used. For example if operators A and B have roaming agreements with each other, and C and D, but not A and C. The same problem arises in 2G and 3G networks.

A computer network ties a number of computers, terminals and wireless devices together for exchange of information. These computers, terminals and wireless devices are also called nodes of the network.

SUMMARY

The objective of embodiments herein is therefore to obviate at least one of the above disadvantages and to provide improved roaming control for IMS APN.

The APN "IMS" is to be used among operators, and it shall be resolved to a local PDN GW in the visited network for Multimedia Telephony Service (MMTel) services. If a roaming user equipment visits a network without IMS support, the IMS APN shall be home routed to a PDN GW in the home network. Reasons for the user equipment to use the IMS APN may be to negotiate supplementary services for CS, or for using other non-voice IMS services such as RCS. The IMS APN is used also for service management for VoLTE services over CS, where the IMS APN will be used also in 2G and 3G networks in addition to LTE networks.

According to a first aspect, the objective is achieved by a method in a second network node in a visited communication network. The visited communication network is visited by a user equipment. The second network node receives, from a first network node in a home communication network, a reply message comprising subscription information for the user equipment. Which subscription information comprises a first parameter indicating that the user equipment is allowed to use multimedia services in the home communication network or the visited communication network. The second network node selects a serving gateway in the visited communication network. Based on the first parameter, the second network node selects a visited packet data network gateway, referred to as V-PDN GW, in the visited communication network when user equipment is allowed to use the multimedia services in the visited communication network. Based on the first parameter, the second network node selects a home packet data network gateway, referred to as H-PDN GW, in the home communication network when the user equipment is allowed to use the multimedia services in the home communication network.

According to a second aspect, the objective is achieved by a method in a first network node in a home communication network. The first network node receives a request message from a second network node in a visited communication network. The visited communication network is visited by a user equipment. The request message indicates a request for subscription information for the user equipment. The first network node transmits, to the second network node, a reply message comprising subscription information. The subscription information comprises a first parameter indicating that the user equipment is allowed to use the multimedia services in the visited communication network or in the home communication network.

According to a third aspect, the objective is achieved by a second network node in a visited communication network. The visited communication network is visited by a user equipment. The second network node comprises a receiving unit configured to receive, from a first network node in a home communication network a reply message comprising subscription information for the user equipment. The subscription information message comprises a first parameter indicating that the user equipment is allowed to use a multimedia service in the home communication network or in the visited communication network. Further, the second network node comprises a selecting unit which is configured to select a serving gateway in the visited communication network. The selecting unit is further configured to, based on the first parameter, select a visited packet data network gateway, referred to as V-PDN GW, in the visited communication network when the user equipment is allowed to use the multimedia service in the visited communication network. The selecting unit is further configured to, based on the first parameter, select a home packet data network gateway, referred to as H-PDN GW, in the home communication network when the user equipment is allowed to use the multimedia service in the home communication network.

According to a fourth aspect, the objective is achieved by a first network node in a home communication network. The first network node further comprises a transmitting unit configured to transmit, to a second network node in a visited communication network, a reply message comprising subscription information. The subscription information comprises a first parameter indicating that a user equipment is allowed to use a multimedia service in the home communication network or in the visited communication network. The visited communication network is visited by the user equipment.

Thanks to the use of the first parameter indicating that the user equipment is allowed to use the multimedia services in the visited communication network or the home communication network, improved roaming control for IMS APN is achieved.

Embodiments herein afford many advantages, for which a non-exhaustive list of examples follows:

An advantage of the embodiments herein is that a visited user in a network that has deployed the IMS APN, but that only has an LTE roaming agreement and not an IMS roaming agreement with the visited users home network, may get IMS services such as configuration of voice supplementary services or RCS. The end user experience will otherwise be that these services cease to exist in certain networks.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings and in which.

The drawings are not necessarily to scale and the dimensions of certain features may have been exaggerated for the sake of clarity, emphasize is instead being placed upon illustrating the principle of the embodiments herein.

DETAILED DESCRIPTION

Figure 3:
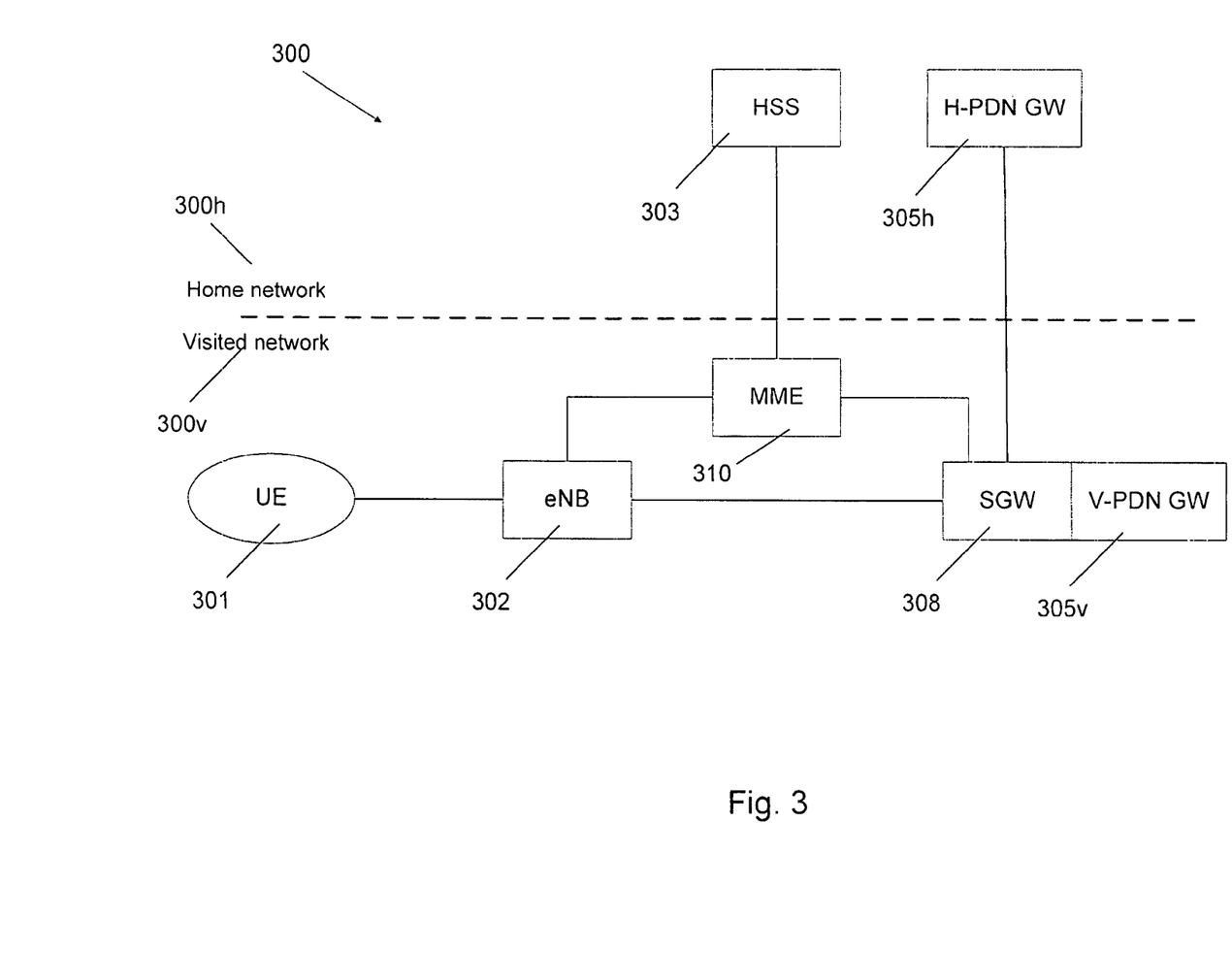
FIG. 3 is a flow chart illustrating embodiments of a communication network

FIG. 3 is a block diagram depicting a communication network 300. The communication network 300 may use radio access technologies such as LTE, GSM, WiMAX etc. The communication network 300 comprises a home communication network 300$h$ and a visited communication network 300$v$. The home communication network 300$h$ may be referred to as home network 300$h$ or HPLMN and the visited communication network 300$v$ may be referred to as visited network 300$v$ or VPLMN. The home network 300$h$ refers to the network being registered as the home of a user equipment 301. The user equipment 301 may roam between for example the home network 300$h$ and the visited network 300$v$. The user equipment 301 is connected to a base station(s), such as an eNodeB 302. Even though FIG. 3 shows only one user equipment 301 and only one eNodeB 302, the communication network 300 may comprise a plurality of user equipment 301 and a plurality of eNodeBs 302.

The user equipment 301 may be any suitable communication device or computational device with communication capabilities capable to communicate with a base station 302 over a radio channel, for instance but not limited to mobile phone, smart phone, personal digital assistant (PDA), laptop, MP3 player or portable DVD player (or similar media content devices), digital camera, or even stationary devices such as a PC. A PC may also be connected via a mobile station as the end station of the broadcasted/multicasted media. The user equipment 301 may also be an embedded communication device in e.g. electronic photo frames, cardiac surveillance equipment, intrusion or other surveillance equipment, weather data monitoring systems, vehicle, car or transport communication equipment, etc. The user equipment 301 is referred to as UE in some of the figures.

The home network 300$h$ comprises a HSS 303, a home PDN GW (H-PDN GW) 305$h$. The visited network 300$v$ comprises a SGW 308 and a visited PDN GW (V-PDN GW) 305v. The SGW 308 is connected to the H-PDN GW 305h in the home network 300h. The visited network 300v further comprises an MME 310 which is connected to the HSS 303 in the home network 300h. In some cases, such as in LTE, the MME 310 may be a combined MME 310 and Serving GPRS Support Node (SGSN) node (not shown). The SGSN is responsible for the delivery of data packets from and to the user equipments 301 within its geographical service area. In the following, the term MME 310 will be used for both a separate MME 310 and a combined SGSN/MME 310.

Figure 4:
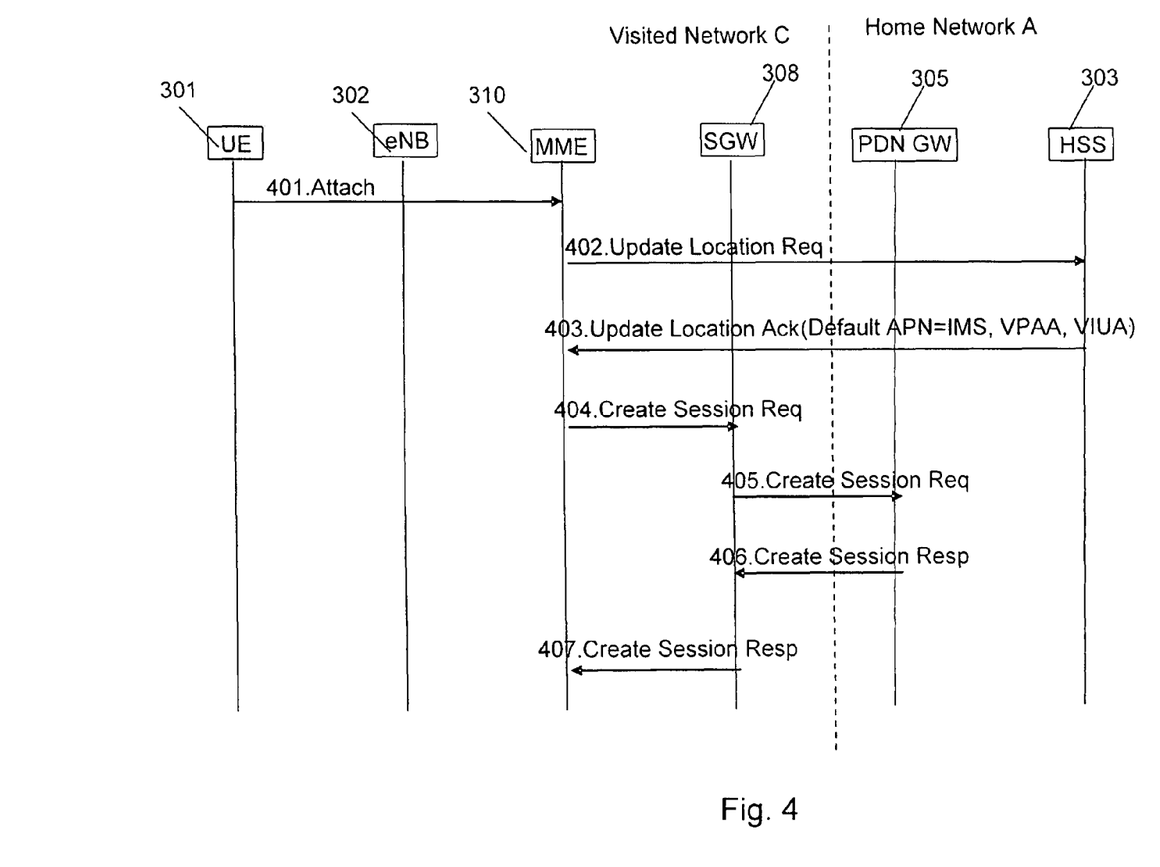
FIG. 4 is a flow chart illustrating embodiments of a method in a communication network.

FIG. 4 is a combined flowchart and signalling diagram depicting an example of a method for allowing a user equipment 301 to use a multimedia service in a home communication network 300h or a visited communication network 300v. In FIG. 4, the home network 300h is named A, and the visited network 300v is named C. The visited network 300v supports IMS APN, but has no roaming agreement with the home network 300h The visited network 300v has only an LTE roaming agreement with the home network 300h.

The FIG. 4 is equally applicable if the APN is given from the user equipment 301 during Attach, or during the user equipment 301 initiated PDN Connection procedure. Steps 404-407 in FIG. 4 will not be described in very much detail, as they are standard procedures, understood by a person skilled in the art. The embodiments herein aims at avoiding that the user equipment 301 gets the IMS APN resolved in the visited network 300v, and instead provide an identifier to allow selecting the PGW 305h in home network 300h, in the case where the IMS roaming agreement is not in place. The identifier allows selection between using multimedia services either in the visited or home network. The identifier stops the UE 301 from getting the IMS APN pointing at the PGW 305v in the visited network 300v, and instead pointing at a PGW 305h in the home network 300h.

The method comprises the following steps:

Step 401

The user equipment 301 transmits an Attach message to the MME 310 in the visited network 300v.

In some embodiments, e.g. in LTE, the Attach will give the user equipment 301 connectivity to the default APN, which is expected to be the IMS APN.

In some embodiments, the UE 301 connects to the IMS APN by sending the PDN Connectivity Request some time after Attach (not shown in FIG. 4).

In some embodiments, e.g. 2G/3G, where the UE 301 does not get connected to a GGSN in Attach, the user equipment 301 sends an Activate PDP Context Request to the SGSN (not shown in FIG. 4).

Step 402

The MME 310 transmits an Update Location Request message to the HSS 303 in the home network 300h.

Step 403

The HSS 303 responds to the Update Location Request message by transmitting an Update Location Acknowledgement back to the MME 310. In other words, the HSS 303 sends the parameters for the IMS APN, which is the default APN. The parameters VPLMN Address Allowed (VPAA) and Visited IMS usage allowed (VIUA) are not set. The HSS 303 is a database comprises subscription data for each user equipment 301 that is provided to the SGSN/MME 310 during the Update Location message. The Update Location message comprises subscription data such as the IMS, VPAA, VIUA etc. These parameters will be described in detail below.

One part comprised in the Update Location message is subscription details for each Access Point Name (APN) that the user equipment 301 is allowed to use. The basic scenario is that the IMS APN is the default APN for the user equipment 301, i.e. in LTE access, but there may be deployments where the IMS APN is not the default APN. If the IMS APN is not the default APN, the user equipment 301 must send it to the network, i.e. the HSS 303, to indicate that it wants to use the IMS APN. The MME 310 will make a check if the IMS APN is allowed, based on the subscription data.

A parameter in the HSS 303 is for the IMS APN to indicate if usage of the IMS APN on a PDN GW 305v in the visited network 300v is allowed. As an example, the name of the parameter may be "Visited IMS usage allowed" (VIUA). This parameter may be used by the MME 310 when selecting the PDN GW 305, to determine if the IMS APN shall be resolved to a PDN GW 305 in home network 300h or a PDN GW 305 in the visited network 300v. The parameter may be a flag, such as e.g. "Visited IMS usage allowed", which set to false when a PDN GW 305 in the home network 300h should be selected, and which is set to true when a PDN GW 305 in the visited network 300v should be selected. The parameter may also be an information element, which is set to 1 if the PDN GW 305 in the home network 300h should be selected, and which is set to 0 when a PDN GW 305 in the visited network 300v should be selected. Further, the parameter may be related to a certain value for selection of PDN GW 305 in the home network 300h, and another value for selection of a PDN GW 305 in the visited network 300v. A rage of values may also be used for indicating selection of a PDN GW 305 in the home network 300h and another range of values for selection of a PDN GW 305 in the visited network 300v.

Another parameter in the HSS 303, VPLMN Address Allowed" (VPAA), specifies whether the use equipment 301 is allowed to use the PDN GW 305 in the domain of the home network 300h only for this APN, or additionally the PDN GW 305 in the domain of the VPLMN. This parameter does not take into account if the home and visited network have any IMS roaming agreements, only if they have LTE roaming agreements. This parameter is still applicable and useful for an APN that does not require special roaming agreements.

The parameter "Visited IMS usage allowed" may be seen as overriding the parameter "VPLMN Address Allowed".

Steps 404 and 405

The MME 310 selects a SGW 308 and a PDN GW 305 using the IMS APN received from the HSS 303. Since the VPAA and VIUA are not set, a PDN GW 305 in the home network 300h is selected. The MME 310 further transmits a create session request to that SGW 308, and the SGW forwards the create session request to the selected PDN GW 305 in the home network 300h.

When the user equipment 301 attaches to the visited network with the IMS APN, or uses the IMS APN in the "UE Requested PDN Connectivity" procedure, the MME 310 will select a Serving GW 308 and PDN GW 305 for this user equipment 301.

The MME 310 selects a PDN GW 305 in the home network 300h, if there is no IMS roaming agreement. This may be achieved if the "VPLMN Address Allowed" is not set, but the home operator must set this parameter if any IMS roaming is to be achieved. For example, it may be the case that the home operator A has an IMS roaming agreement with operator B, but not with operator C. And then Operator A must have an LTE roaming agreement with both operators B and C in this scenario. This means that the user equipment 301 will get a local PDN GW 305 in operator B network, and there will be no problems. But if the user equipment 301 roams to operator C, that is using the IMS APN for its own subscribers in its network 300, the user equipment 301 will also get a PDN GW 305 for its IMS services in the visited network 300v, but since there is no IMS roaming agreement, there is no IMS level connectivity between operator A and C.

Using the parameter "Visited IMS usage allowed", the user equipment 301 will Attach with the IMS APN in operator C network, and the "Visited IMS usage allowed" is not set. The MME 310 shall then select a PDN GW 305 in the home network 300*h*, since 20 there is no IMS roaming agreement. To make the solution backwards compatible towards MMEs 310 that does not support the parameter "Visited IMS usage allowed", it may be a recommendation for the home network 300*h* to not set "VPLMN Address Allowed". This may stop any selection of local PDN GW 305 in a network without IMS roaming agreement, and instead the flag "Visited IMS usage allowed" may be used.

Step 406

The PDN GW 305 in the home network 300*h* transmits a create session response to the SGW 308.

Step 407

The SGW 310 forwards the create session response to the MME 310.

Figure 5:
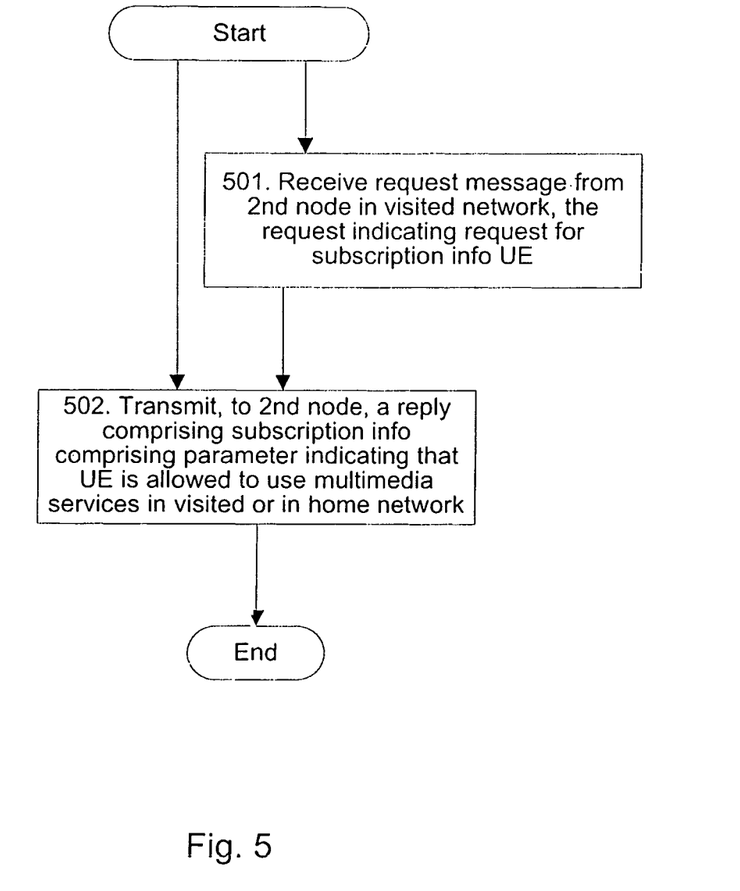
FIG. 5 is a flow chart illustrating embodiments of a method in a first network node.

The method described above will now be described seen from the perspective of the first network node 303. FIG. 5 is a flowchart describing the present method in the first network node 303 in a home communication network 300*h* for allowing a user equipment 301 to use multimedia services in a home communication network or a visited communication network 300*v*. The user equipment 301 is roaming to the visited communication network 300*v*. In some embodiments, the first network node 303 is a Home Subscriber Server, referred to as HSS or a Home Location Register, referred to as HLR. In some embodiments, the home communication network 300*h* and visited communication network 300*v* is based on Long Term Evolution, referred to as LTE, second Generation, referred to as 2G or third Generation, referred to as 3G.

In some embodiments, the visited communication network 300*v* comprises the multimedia service. In some embodiments, there is not any IP Multimedia Subsystem, referred to as IMS, roaming agreement between the visited communication network 300*v* and the home communication network 300*h*.

The method comprises the steps to be performed in the first network node 303:

Step 501

In some embodiments, the first network node 303 receives a request message from a second network node 310 in the visited communication network 300*v*. The request message indicates a request for subscription information for the user equipment 301.

In some embodiments, the second network node 310 is a Mobility Management Entity, referred to as MME, or a Serving General Packet Radio Services Support Node, referred to as SGSN.

Step 502

The first network node 303 transmits a reply message comprising subscription information to the second network node 310 in a visited communication network 300*v*. The subscription information comprises a first parameter indicating that the user equipment 301 is allowed to use a multimedia service in the home communication network 300*h* or in the visited communication network 300*v*. The visited communication network 300*v* is visited by the user equipment 301.

In some embodiments, the first parameter is a "Visited IMS usage allowed"-parameter.

In some embodiments, subscription information further comprises a second parameter comprising an internet protocol multimedia subsystems access point name, referred to as IMS APN.

In some embodiments, the user equipment 301 is allowed to use the multimedia service in the visited communication network when there is an internet protocol multimedia subsystem, referred to as IMS, roaming agreement between the visited communication network 300*v* and the home communication network 300*h*. In some embodiments, the user equipment 301 is allowed to use the multimedia service in the home communication network when there is a long term evolution, referred to as LTE, roaming agreement between the visited communication network 300*v* and the home communication network 300*h*.

Figure 6:
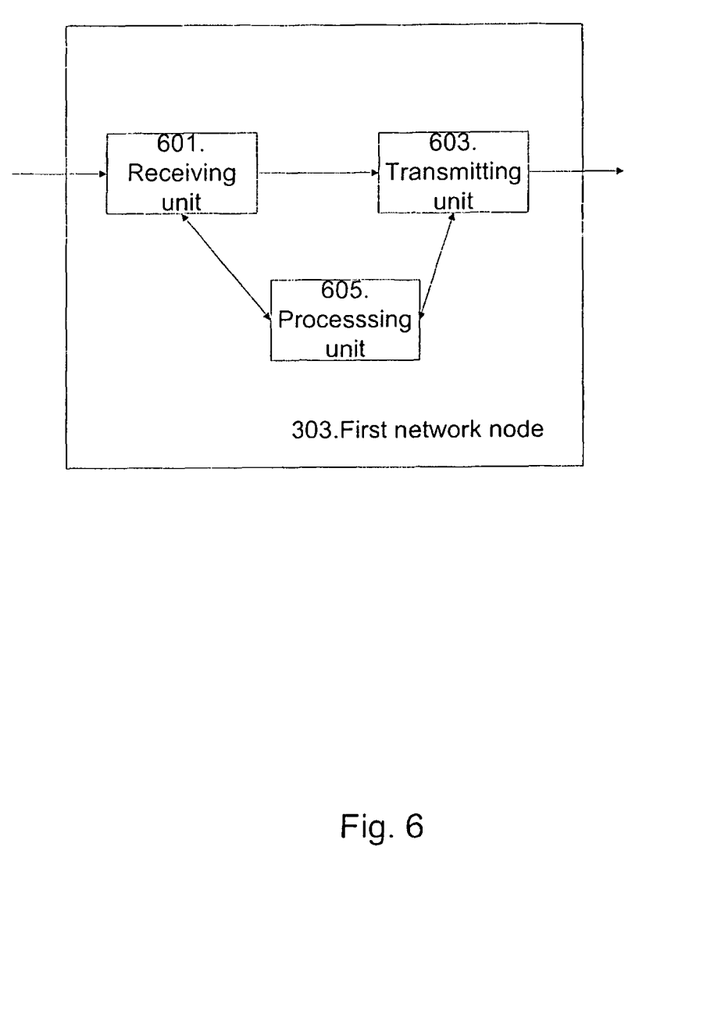
FIG. 6 is a block diagram illustrating embodiments of a first network node.

To perform the method steps shown in FIG. 5 for enabling a user equipment 301 to be allowed to use multimedia services in a home communication network or a visited communication network 300*v*, the first network node 303, in a home communication network 300*h*, comprises an arrangement as shown in FIG. 6.

In some embodiments, the first network node 303 comprises a receiving unit 601 which is configured to receive a request message from a second network node 310 in the visited communication network 300*v*. The request message indicates a request for subscription information for the user equipment 301.

The first network node 303 comprises a transmitting unit 603 configured to transmit a reply message comprising subscription information to the second network node 310 in a visited communication network 300*v*. The subscription information comprises a first parameter indicating that the user equipment 301 is allowed to use the multimedia services in the visited communication network 300*v* or in the home communication network 300*h*. The visited communication network 300*v* is visited by the user equipment 301.

In some embodiments, the first network node 303 is a Home Subscriber Server, referred to as HSS or a Home Location Register, referred to as HLR, and the second network node 310 is a Mobility Management Entity, referred to as MME, or a Serving General Packet Radio Services Support Node, referred to as SGSN.

In some embodiments, the home communication network 300*h* and visited communication network 300*v* is based on Long Term Evolution, referred to as LTE, second Generation, referred to as 2G or third Generation, referred to as 3G.

In some embodiments, the subscription information further comprises a second parameter comprising an internet protocol multimedia subsystems access point name, referred to as IMS APN.

In some embodiments, the first parameter is a "Visited IMS usage allowed"-parameter.

In some embodiments, the user equipment 301 is allowed to use the multimedia service in the visited communication network when there is an internet protocol multimedia subsystem, referred to as IMS, roaming agreement between the visited communication network 300*v* and the home communication network 300*h*. In some embodiments, the user equipment 301 is allowed to use the multimedia service in the home communication network when there is a long term evolution, referred to as LTE, roaming agreement between the visited communication network 300*v* and the home communication network 300*h*.

Figure 7:
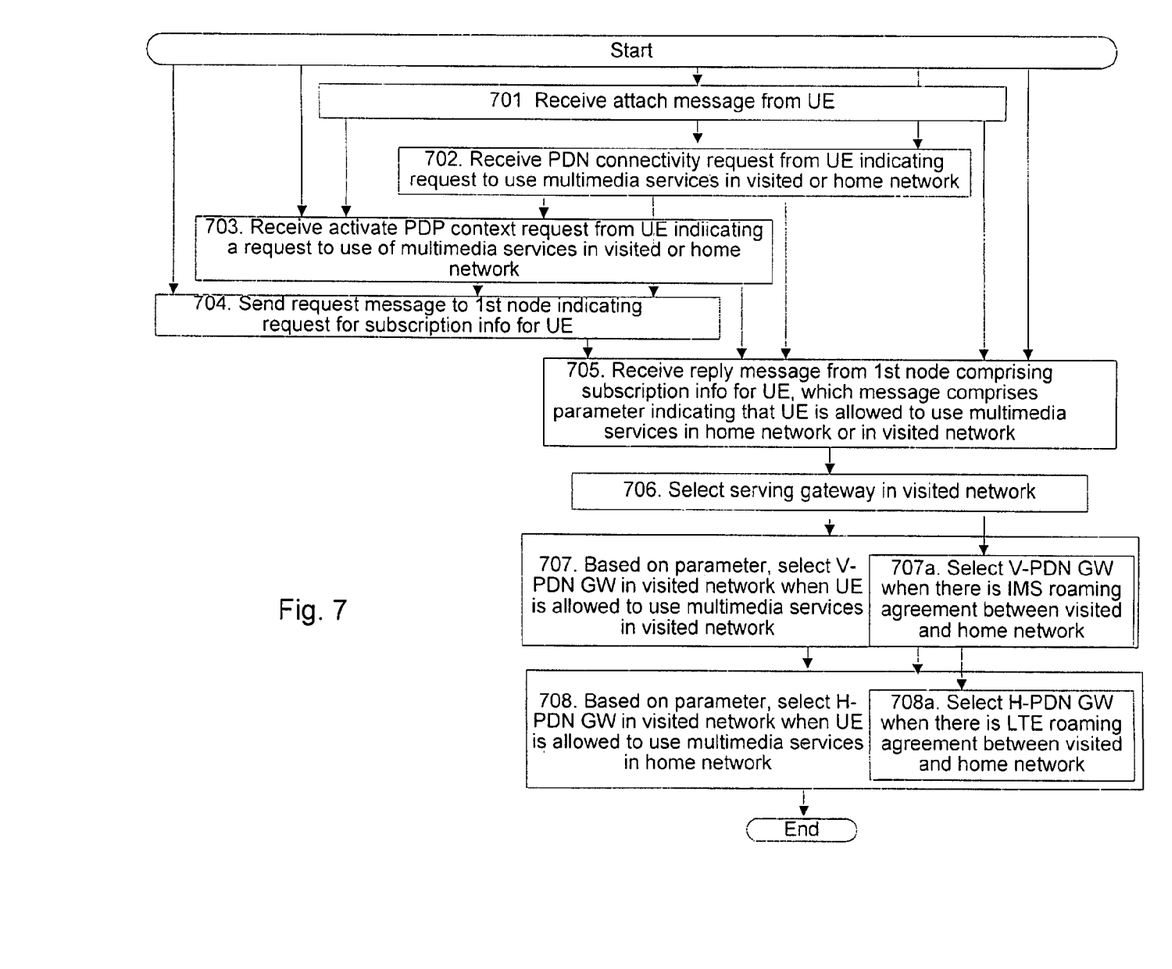
FIG. 7 is a flow chart illustrating embodiments of a method in a second network node.

The method described above will now be described seen from the perspective of the second network node 310. FIG. 7 is a flowchart describing the present method in the second network node 310, in the visited communication network, for allowing a user equipment 301 to use multimedia services in a home communication network or a visited communication network 300*v*. In some embodiments, the first network node 303 is a Home Subscriber Server, referred to as HSS or a Home Location Register, referred to as HLR, and the second network node 310 is a Mobility Management Entity, referred to as MME, or a Serving General Packet Radio Services Support Node, referred to as SGSN.

The method comprises the steps to be performed in the second network node 310:

Step 701

In some embodiments, the second network node 310 receives an attach message from the user equipment 301

In some embodiments, the attach message indicates a request to use of the multimedia services in the home communication network 300h or the visited communication network 300v.

In some embodiments, as in the LTE case, the attach message will give the user equipment 301 connectivity to the default APN, which is expected to be the IMS APN.

Step 702

In some embodiments, this is a step that is performed instead of or after step 701. The second network node 310 may receive a Packet Data Network, referred to as PDN, Connectivity Request from the user equipment 301. The PDN connectivity request indicates a request to use the multimedia service in the home communication network 300h or in the visited communication network 300v.

The PDN Connectivity Request may be done some time after the Attach message is sent in step 701.

Step 703

In some embodiments, this is a step that is performed instead of step 701 or after step 701. In some embodiments, the second network node 310 is a Serving General Packet Radio Services Support Node, referred to as SGSN. The second network node 310 may receive an Activate Packet Data Protocol, referred to as PDP, Context Request from the user equipment 301. The Activate PDP Context Request indicates a request to use the multimedia service in the home communication network 300h or the visited communication network 300v.

In some embodiments, e.g. in a 2G/3G case, where the user equipment 301 does not get connected to a GGSN in the Attach in step 701, the second network node 310, i.e. the SGSN, receives an Activate PDP Context Request from the user equipment the SGSN.

In 2G/3G will the Attach procedure not involve GGSN (or SGW or PGW), but SGSN is involved, and subscription data is fetched from HLR/HSS. In some embodiments, the Activate PDP Context Request is sent immediately after the Attach in step 701, but it may be sent e.g. one month later or whenever necessary or requested. Note that before the user equipment 301 have sent a PDP Context request and have gotten an IP address, it may only be used for Circuit Switched (CS) voice or Short Message Service (SMS).

Step 704

In some embodiments, the second network node 310 sends a request message to the first network node 303. The request message indicates a request for subscription information for the user equipment 301.

Step 705

The second network node 310 receives, from the first network node 303 in the home communication network 300h, a reply message comprising subscription information for the user equipment 301. The subscription information message comprises a first parameter indicating that the user equipment 301 is allowed to use a multimedia service in the home communication network 300h or in the visited communication network 300v.

In some embodiments, the first parameter is a "Visited IMS usage allowed"-parameter.

In some embodiments, the reply message is a reply to the request message sent in step 704 described above.

In some embodiments, the subscription information further comprises a second parameter comprising an internet protocol multimedia subsystems access point name, referred to as IMS APN.

Step 706

The second network node 310 selects a serving gateway 308 in the visited communication network 300v.

Step 707

Based on the first parameter, the second network node 310 selects a visited packet data network gateway 305, referred to as V-PDN GW, in the visited communication network 300v when the user equipment 301 is allowed to use the multimedia service in the visited communication network 300v.

In some embodiments, the second network node 310 selects the visited packet data network gateway 30 further based on the second parameter.

Step 707a

This is a substep of step 707.

In some embodiments, the second network node 310 selects the V-PDN GW 305v when there is an internet protocol multimedia subsystem, referred to as IMS, roaming agreement between the visited communication network 300v and the home communication network 300h.

Step 708

Based on the first parameter, the second network node 310 selects a home packet data network gateway 305h, referred to as H-PDN GW, in the home communication network 300h when the user equipment 301 is allowed to use the multimedia service in the home communication network 300h.

In some embodiments, the second network node 310 selects the home packet data network gateway 30 further based on the second parameter.

Step 708a

This is a substep of step 708.

In some embodiments, the second network node 310 selects the H-PDN GW 305h when there is a long term evolution, referred to as LTE, roaming agreement between the visited communication network 300v and the home communication network 300h.

In some embodiments, the first parameter is a flag, and the packet data network gateway 305 is selected in the visited communication network 300v if the first parameter is set to true and the packet data network gateway 305 is selected in the home communication network 300h if the first parameter is set to false.

In some embodiments, a packet data network gateway 305 is selected in the visited communication network 300v if the first parameter has a first value and the packet data network gateway 305 is selected in the home communication network 300h if the first parameter has a second value.

Figure 8:
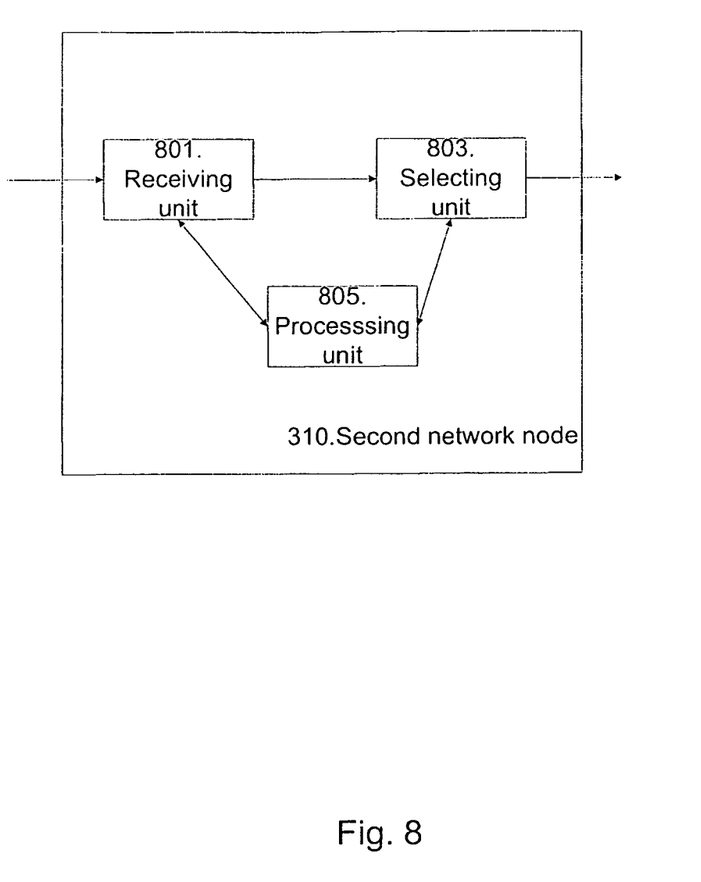
FIG. 8 is a block diagram illustrating embodiments of a second network node.

To perform the method steps shown in FIG. 7 for enabling a user equipment 301 to be allowed to use a multimedia service in a home communication network 300h or a visited communication network 300v, the second network node 310 comprises an arrangement as shown in FIG. 8. The second network node 310 is comprised in the visited communication network 300v. The visited communication network 300v is visited by the user equipment 301

The second network node 310 comprises a receiving unit 801 configured to receive a reply message comprising subscription information for the user equipment 301 from a first network node 303 in the home communication network 300h. The subscription information message comprises a first parameter indicating that the user equipment 301 is allowed to use the multimedia service in the home communication network 300h or in the visited communication network 300v. In some embodiments, the receiving unit 801 is further configured to receive an attach message from the user equipment 301. The attach message may indicate a request to use of the multimedia service in the home communication network 300h or in the visited communication network 300v. In some embodiments, the first parameter is a "Visited IMS usage allowed"-parameter.

In some embodiments, the receiving unit 801 is further configured to receive a Packet Data Network, referred to as PDN, Connectivity Request from the user equipment 301. The PDN connectivity request indicates a request to use the multimedia service in the home communication network 300h or the visited communication network 300v.

In some embodiments, where the second network node 310 is a Serving General Packet Radio Services Support Node, referred to as SGSN, the receiving unit 801 is further configured to receive an Activate Packet Data Protocol, referred to as PDP, Context Request from the user equipment 301. The Activate PDP Context Request indicates a request to use the multimedia service in the home communication network 300h or the visited communication network 300v.

Further, the second network node 310 comprises a selecting unit 803 configured to select a serving gateway 308 in the visited communication network 300v. The selecting unit 803 is further configured to based on the first parameter, select a visited packet data network gateway 305v, referred to as V-PDN GW when the user equipment 301 is allowed to use the multimedia service in the visited communication network 300v. The selecting unit 803 is configured to, based on the first parameter, select a home packet data network gateway 305h, referred to as H-PDN GW, in the home communication network 300h when the user equipment 301 is allowed to use the multimedia service in the home communication network 300h.

In some embodiments, the selecting unit 803 is further configured to select the V-PDN GW 305v when there is an internet protocol multimedia subsystem, referred to as IMS, roaming agreement between the visited communication network 300v and the home communication network 300h. In some embodiments, the selecting unit 803 is further configured to select the H-PDN GW 305h when there is a long term evolution, referred to as LTE, roaming agreement between the visited communication network 300v and the home communication network 300h.

In some embodiments, the first parameter is a flag, and the packet data network gateway 305 is selected in the visited communication network 300v if the first parameter is set to true. The packet data network gateway 305 is selected in the home communication network 300h if the first parameter is set to false.

In some embodiments, a packet data network gateway 305 is selected in the visited communication network 300v if the first parameter has a first value and the packet data network gateway 305 is selected in the home communication network 300h if the first parameter has a second value.

In some embodiments, the first network node 303 is a Home Subscriber Server, referred to as HSS or a Home Location Register, referred to as HLR, and the second network node 310 is a Mobility Management Entity, referred to as MME, or a Serving General Packet Radio Services Support Node, referred to as SGSN.

In some embodiments, the subscription information further comprises a second parameter comprising an internet protocol multimedia subsystems access point name, referred to as IMS APN. In some embodiments, the selecting unit (803) is further configured to select the visited packet data network gateway 305v, referred to as V-PDN GW, in the visited communication network 300v based on the second parameter, and to select a home packet data network gateway 305h, referred to as H-PDN GW, in the home communication network 300h based on the second parameter.

In some embodiments, the second network node 310 comprises a processing unit 805 configured to send a request message to the first network node 303. The request message indicates a request for subscription information for the user equipment 301. In some embodiments, the reply message is a reply to the request message.

The present mechanism for enabling a user equipment 301 to be allowed to use multimedia services in a home communication network 300h or a visited communication network 300v may be implemented through one or more processors, such as a processing unit 605 in the first network node 303 depicted in FIG. 6 and a processor 805 in the second network node 310 depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the first network node 303 and/or second network node 310. One such carrier may be in the form of a CD ROM disc. It is however feasible with other data carriers such as a memory stick. The computer program code may furthermore be provided as pure program code on a server and downloaded to the first network node 303 and/or second network node 310 remotely.

Summarized, a flag or parameter in the HSS 303 for the IMS APN: "Visited IMS usage allowed" and to additional logic in the MME/SGSN 310 provides improved Roaming control for IMS APN This "Visited IMS usage allowed" flag or parameter is to be used by the MME 310 or SGSN in the visited network 300v to allow selection of a local PDN GW 305 for the IMS APN, but only if there is an IMS roaming agreement towards the home network 300h. If there is no IMS roaming agreement, a PDN GW 305 in the home network 300h is selected instead.

The "VPLMN Address Allowed" flag in the HSS 310 is set to false for the IMS APN, to avoid that the user equipment 301 gets local access to the IMS APN if there is no IMS roaming agreement.

Note that the MME 310 or SGSN in the visited network 300v anyway need to have information if there is an IMS roaming agreement or not, due to the logic for setting the "IMS voice over PS Session Supported Indication" from the MME 310 or the SGSN.

The embodiments herein are equally applicable in 2G/3G access. The subscription data may be handled in the HSS/HLR in an equal way as for LTE access, and with the same additional parameter "Visited IMS usage allowed", but is sent to SGSN instead of MME 310.

The embodiments herein are not limited to the above described preferred embodiments. Various alternatives, modifications and equivalents may be used. Therefore, the above embodiments should not be taken as limiting the scope of the embodiments, which are defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a second network node (310) in a visited communication network (300v), which visited communication network (300v) is visited by a user equipment (301), the method comprising:
   receiving (705), from a first network node (303) in a home communication network (300h), a reply message comprising subscription information for the user equipment (301), which subscription information comprises a first parameter indicating that the user equipment (301) is allowed to use a multimedia service in the home communication network (300h) or in the visited communication network (300v);
   selecting (706) a serving gateway (308) in the visited communication network (300v);
   based on the first parameter, selecting (707) a visited packet data network gateway (305v), referred to as V-PDN GW, in the visited communication network (300v) when the user equipment (301) is allowed to use the multimedia service in the visited communication network (300v);
   based on the first parameter, selecting (708) a home packet data network gateway (305h), referred to as H-PDN GW, in the home communication network (300h) when the user equipment (301) is allowed to use the multimedia service in the home communication network (300h) wherein the selecting (707) the visited packet data network gateway (305v), referred to as V-PDN GW, in the visited communication network (300v) when the user equipment (301) is allowed to use the multimedia service in the visited communication network (300v) further comprises:
      selecting (707a) the V-PDN GW (305v) when there is an internet protocol multimedia subsystem, referred to as IMS, roaming agreement between the visited communication network (300v) and the home communication network (300h); and
   wherein the selecting (708) the home packet data network gateway (305h), referred to as H-PDN GW, in the home communication network (300h) when the user equipment (301) is allowed to use the multimedia service in the home communication network (300h) further comprises:
      selecting (708a) the H-PDN GW (305h) when there is a long term evolution, referred to as LTE, roaming agreement between the visited communication network (300v) and the home communication network (300h).

2. The method according to claim 1, wherein the first parameter is a "Visited IMS usage allowed"-parameter.

3. The method according to claim 1, further comprising:
   sending (704) a request message to the first network node (303), the request message indicating a request for subscription information for the user equipment (301); and wherein the reply message is a reply to the request message.

4. The method according to claim 1, further comprising:
   receiving (701) an attach message from the user equipment (301).

5. The method according to claim 4, wherein the attach message indicates a request to use of the multimedia services in the home communication network (300h) or the visited communication network (300v).

6. The method according to claim 1, further comprising:
   receiving (702) a packet data network, referred to as PDN, connectivity request from the user equipment (301), the PDN connectivity request indicates a request to use the multimedia service in the home communication network (300h) or the visited communication network (300v).

7. The method according to claim 1, wherein the second network node (310) is a serving general packet radio services support node, referred to as SGSN, and wherein the method further comprising:
   receiving (703) an activate packet data protocol, referred to as PDP, context request from the user equipment (301), the activate PDP context request indicates a request to use the multimedia service in the home communication network (300h) or the visited communication network (300v).

8. The method according to claim 1, wherein the first parameter is a flag, and
   wherein the visited packet data network gateway (305v) is selected in the visited communication network (300v) if the first parameter is set to true and wherein the home packet data network gateway (305h) is selected in the home communication network (300h) if the first parameter is set to false.

9. The method according to claim 1, wherein the visited packet data network gateway (305v) is selected in the visited communication network (300v) if the first parameter has a first value, and wherein the home packet data network gateway (305h) is selected in the home communication network (300h) if the first parameter has a second value.

10. The method according to claim 1, wherein the first network node (303) is a home subscriber server, referred to as HSS or a home location register, referred to as HLR, and wherein the second network node (310) is a mobility management entity, referred to as MME, or a serving general packet radio services support node, referred to as SGSN.

11. The method according to claim 10, wherein the selecting a visited packet data network gateway (305v), referred to as V-PDN GW, in the visited communication network (300v) is further based on the second parameter; and wherein the selecting the a home packet data network gateway (305h), referred to as H-PDN GW, in the home communication network (300h) is further based on the second parameter.

12. A method in a first network node (303) in a home communication network (300h), the method comprising:
   transmitting (502), to a second network node (310) in a visited communication network (300v), a reply message comprising subscription information, which subscription information comprises a first parameter indicating that a user equipment (301) is allowed to use a multimedia service in the visited communication network (300v) or in the home communication network (300v), which visited communication network (300v) is visited by the user equipment (301) wherein the user equipment (301) is allowed to use the multimedia service in the visited communication network when there is an internet protocol multimedia subsystem, referred to as IMS, roaming agreement between the visited communication network (300v) and the home communication network (300h), and wherein the user equipment (301) is allowed to use the multimedia service in the home communication network when there is an long term evolution, referred to as LTE, roaming agreement between the visited communication network (300v) and the home communication network (300h).

13. The method according to claim 12, further comprising:
receiving (501) a request message from the second network node (310), the request message indicating a request for subscription information for the user equipment (301).

14. The method according to claim 12, wherein the first parameter is a "Visited IMS usage allowed"-parameter.

15. The method according to claim 12, wherein the first network node (303) is a home subscriber server, referred to as HSS or a home location register, referred to as HLR, and wherein the second network node (310) is a mobility management entity, referred to as MME, or a serving general packet radio services support node, referred to as SGSN.

16. The method according to claim 12, wherein the home communication network (300h) and visited communication network (300v) is based on long term evolution, referred to as LTE, second generation, referred to as 2G or third generation, referred to as 3G.

17. The method according to claim 12, wherein the subscription information further comprises a second parameter comprising an internet protocol multimedia subsystems access point name, referred to as IMS APN.

18. A second network node (310) in a visited communication network (300v), which visited communication network (300v) is visited by a user equipment (301), the second network node (310) comprising:
a receiving unit (801) configured to receive, from a first network node (303) in a home communication network (300h), a reply message comprising subscription information for the user equipment (301), which subscription information comprises a first parameter indicating that the user equipment (301) is allowed to use a multimedia service in the home communication network (300h) or in the visited communication network (300v); and
a selecting unit (803) configured to:
select a serving gateway (308) in the visited communication network (300v);
based on the first parameter, select a visited packet data network gateway (305v), referred to as V-PDN GW, in the visited communication network (300v) when the user equipment (301) is allowed to use the multimedia service in the visited communication network (300v);
based on the first parameter, select a home packet data network gateway (305h), referred to as H-PDN GW, in the home communication network (300h) when the user equipment (301) is allowed to use the multimedia service in the home communication network (300h);
select the V-PDN GW (305v) when there is an internet protocol multimedia subsystem, referred to as IMS, roaming agreement between the visited communication network (300v) and the home communication network (300h); and to
select the H-PDN GW (305h) when there is a long term evolution, referred to as LTE, roaming agreement between the visited communication network (300v) and the home communication network (300h).

19. The second network node (310) according to claim 18, wherein the first parameter is a "Visited IMS usage allowed"-parameter.

20. The second network node (310) according to claim 18, further comprising a processing unit (805) configured to send a request message to the first network node (303), the request message indicating a request for subscription information for the user equipment (301); and wherein the reply message is a reply to the request message.

21. The second network node (310) according to claim 18, wherein the receiving unit (801) is further configured to receive an attach message from the user equipment (301).

22. The second network node (310) according to claim 18, wherein the receiving unit (801) is further configured to receive a packet data network, referred to as PDN, connectivity request from the user equipment (301), the PDN connectivity request indicates a request to use the multimedia service in the home communication network (300h) or the visited communication network (300v).

23. The second network node (310) according to claim 18, wherein the second network node (310) is a serving general packet radio services support node, referred to as SGSN, and wherein
the receiving unit (801) is further configured to receive an activate packet data protocol, referred to as PDP, context request from the user equipment (301), the activate PDP context request indicates a request to use the multimedia service in the home communication network (300h) or the visited communication network (300v).

24. The second network node (310) according to claim 18, wherein the first parameter is a flag, and
wherein the visited packet data network gateway (305v) is selected in the visited communication network (300v) if the first parameter is set to true and wherein the home packet data network gateway (305h) is selected in the home communication network (300h) if the first parameter is set to false.

25. The second network node (310) according to claim 18, wherein the visited packet data network gateway (305v) is selected in the visited communication network (300v) if the first parameter has a first value, and wherein the home packet data network gateway (305h) is selected in the home communication network (300h) if the first parameter has a second value.

26. The second network node (310) according to claim 18, wherein the first network node (303) is a home subscriber server, referred to as HSS or a home location register, referred to as HLR, and wherein the second network node (310) is a mobility management entity, referred to as MME, or a serving general packet radio services support node, referred to as SGSN.

27. The second network node (310) according to claim 18, wherein the subscription information further comprises a second parameter comprising an internet protocol multimedia subsystems access point name, referred to as IMS APN.

28. The second network node (310) according to claim 21, wherein the attach message indicates a request to use of the multimedia services in the home communication network (300h) or the visited communication network (300v).

29. The second network node (310) according to claim 27, wherein the selecting unit (803) is further configured to:
select the visited packet data network gateway (305v), referred to as V-PDN GW, in the visited communication network (300v) based on the second parameter; and to
select a home packet data network gateway (305h), referred to as H-PDN GW, in the home communication network (300h) based on the second parameter.

30. A first network node (303) in a home communication network (300h), the first network node (303) comprising:
a transmitting unit (603) configured to transmit, to a second network node (310) in a visited communication network (300v), a reply message comprising subscription information, which subscription information comprising a first parameter indicating that a user equipment (301) is allowed to use a multimedia service in the home communication network (300h) or in the visited communication network (300v), which visited communication network (300v) is visited by the user equipment (301) wherein the user equipment (301) is allowed to use the multimedia service in the visited communication network when there is an internet protocol multimedia subsystem, referred to as IMS, roaming agreement between the visited communication network (300v) and the home communication network (300h), and wherein the user equipment (301) is allowed to use the multimedia service in the home communication network when there is an long term evolution, referred to as LTE, roaming agreement between the visited communication network (300v) and the home communication network (300h).

31. The first network node (303) according to claim 30, further comprising:

a receiving unit (601) configured to receive a request message from the second network node (310), the request message indicating a request for subscription information for the user equipment (301).

32. The first network node (303) according to claim 30, wherein the first parameter is a "Visited IMS usage allowed"-parameter.

33. The first network node (303) according to claim 30, wherein the first network node (303) is a home subscriber server, referred to as HSS or a home location register, referred to as HLR, and wherein the second network node (310) is a mobility management entity, referred to as MME, or a serving general packet radio services support node, referred to as SGSN.

34. The first network node (303) according to claim 30, wherein the home communication network (300h) and visited communication network (300v) is based on long term evolution, referred to as LTE, second generation, referred to as 2G or third generation, referred to as 3G.

35. The first network node (303) according to claim 30, wherein subscription information further comprises a second parameter comprising an internet protocol multimedia subsystems access point name, referred to as IMS APN.

* * * * *